United States Patent
Kiritsi et al.

(10) Patent No.: US 12,521,373 B2
(45) Date of Patent: Jan. 13, 2026

(54) USE OF LOSARTAN FOR THE TREATMENT OF FIBROTIC DISEASES, IN PARTICULAR EPIDERMOLYSIS BULLOSA

(71) Applicant: Crowd Pharma Losartan GmbH & Co. KG, Pforzheim (DE)

(72) Inventors: Dimitra Kiritsi, Gundelfingen (DE); Brigitte Stiller, Freiburg (DE); Klas Alexander Nystroem, Basel (CH); Leena Kaarina Bruckner-Tuderman, Freiburg (DE)

(73) Assignee: Crowd Pharma Losartan GmbH & Co. KG, Pforzheim (DE)

( * ) Notice: Subject to any disclaimer, the term of this patent is extended or adjusted under 35 U.S.C. 154(b) by 778 days.

(21) Appl. No.: 17/788,615

(22) PCT Filed: Dec. 14, 2020

(86) PCT No.: PCT/EP2020/085907
§ 371 (c)(1),
(2) Date: Jun. 23, 2022

(87) PCT Pub. No.: WO2021/130038
PCT Pub. Date: Jul. 1, 2021

(65) Prior Publication Data
US 2023/0036732 A1    Feb. 2, 2023

(51) Int. Cl.
*A61K 31/4178*  (2006.01)
*A61P 17/02*  (2006.01)

(52) U.S. Cl.
CPC .......... *A61K 31/4178* (2013.01); *A61P 17/02* (2018.01)

(58) Field of Classification Search
CPC ............................. A61K 31/4178; A61P 17/02
See application file for complete search history.

(56) References Cited

FOREIGN PATENT DOCUMENTS

WO    WO 2012/068531 A2    5/2012
WO    WO 2017/218623 A1    12/2017

OTHER PUBLICATIONS

Paul Fornes et al., "Losartan's Protective Effects in Stroke-Prone Spontaneously Hypertensive Rats Persist Durably After Treatment Withdrawal", J. of Cardiovascular Pharma., vol. 22, No. 2, pp. 305-313 (Aug. 1, 1993).
Alexander, Nyström et al., "Losartan Ameliorates Dystrophic Epidermolysis Bullosa and Uncovers New Disease Mechanism", EMBO Populare Medicine, vol. 7. No. 9, pp. 1211-1228 (Sep. 1, 2015).
Leena Bruckner-Tuderman, "Newer Treatment Modalities in Epidermolysis Bullosa", Indian Dermatology Online Journal (2019); 10-244-50.
M.T. Khan et al., "Foot Care in Epidermolysis Bullosa: Evidence-Based Guideline", British Journal of Dermatology (2020); 182: 593-604.
Jang Woo Shin et al., "Interpretation of Animal Dose and Human Equivalent Dose for Drug Development", J Kor Orient Med (2010), 31(3):1-7.
Anroop B. Nair et al., "A Simple Practical Guide for Dose Conversion Between Animals and Humans", J Basic Clin Pharma (2016); 7:27-31.

*Primary Examiner* — Sahar Javanmard
(74) *Attorney, Agent, or Firm* — Smith Patent, LLC; Chalin A. Smith

(57) ABSTRACT

The present invention relates to Losartan for use in the treatment of a fibrotic disease, characterized in that a dose of 0.4-1.4 mg/kg body weight of the human patient is administered daily, whereby the fibrotic disease is epidermolysis bullosa.

10 Claims, 10 Drawing Sheets

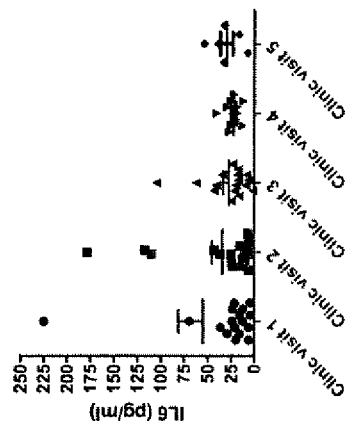
Figure 4
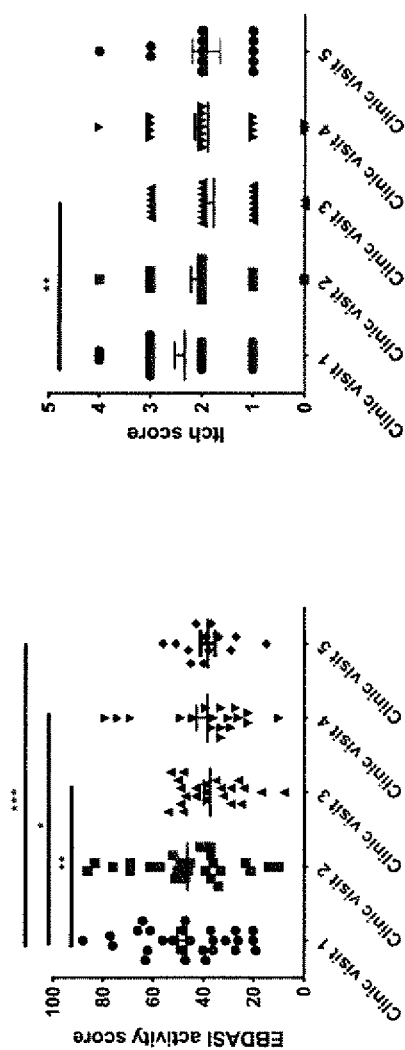
Figure 3
Figure 2

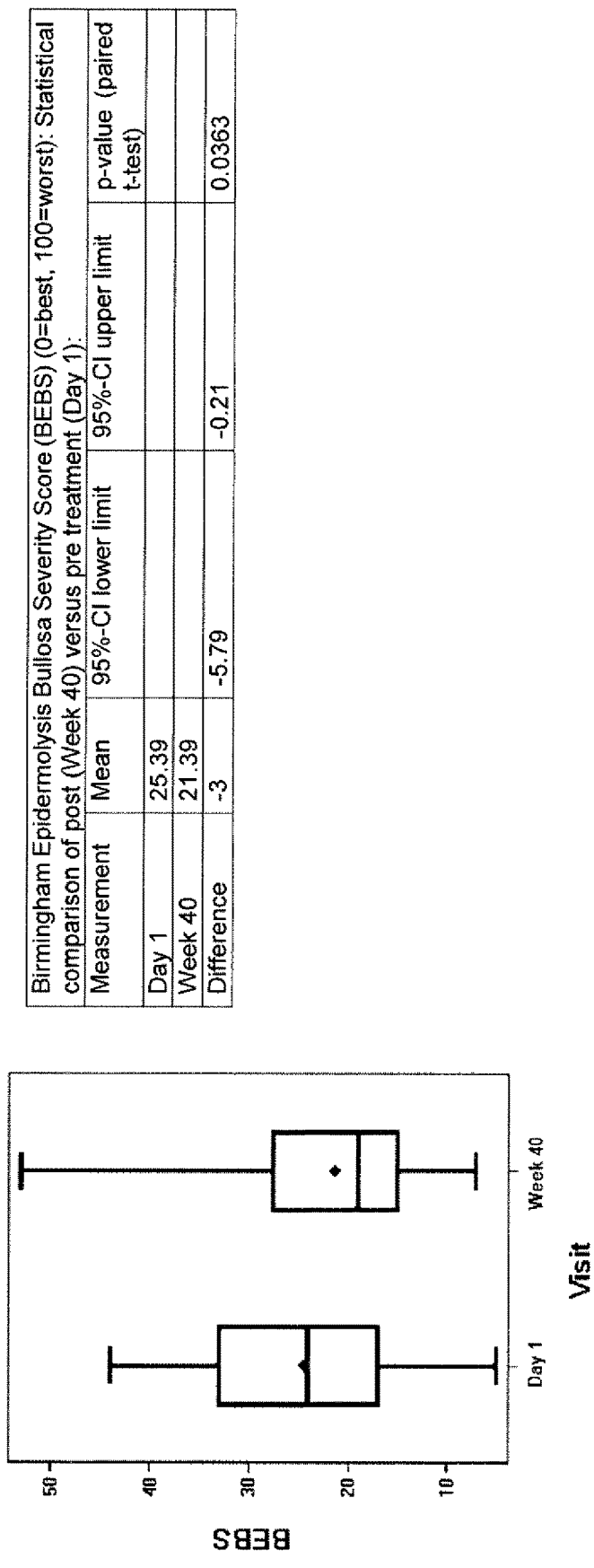
Figure 9: The BEBS score decreased significantly after losartan treatment, indicating an improvement of the RDEB disease state.

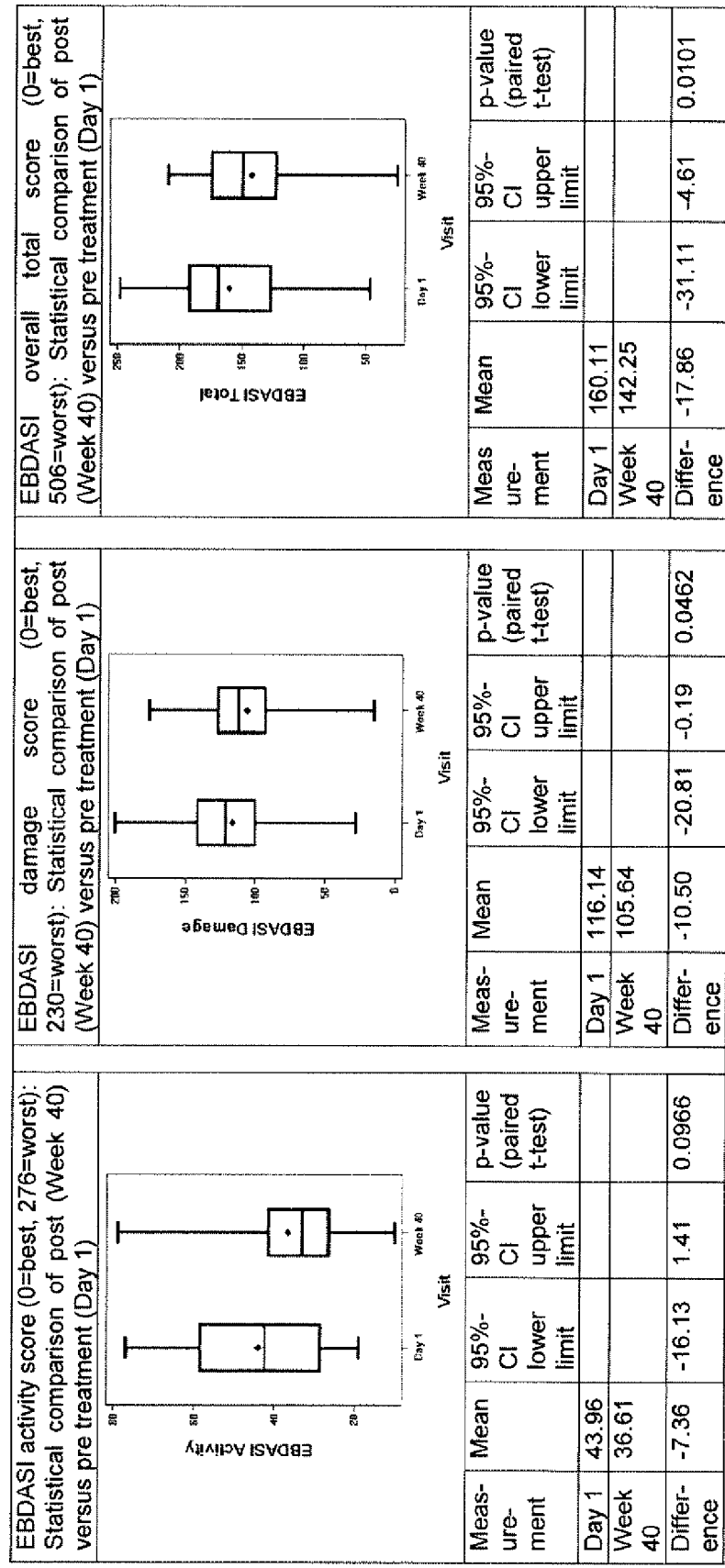
Figure 10: The EBDASI score decreased after losartan treatment, indicating improvement of the RDEB disease state.

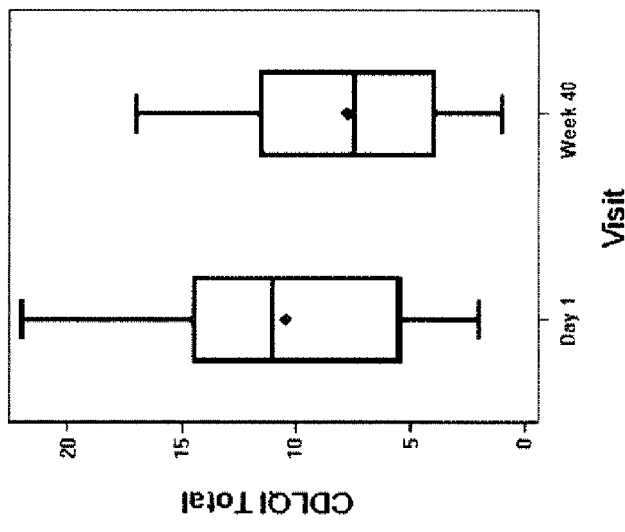
Figure 11: The CDLQI score decreased after losartan treatment, indicating a significant improvement in the quality of life of the RDEB patients.

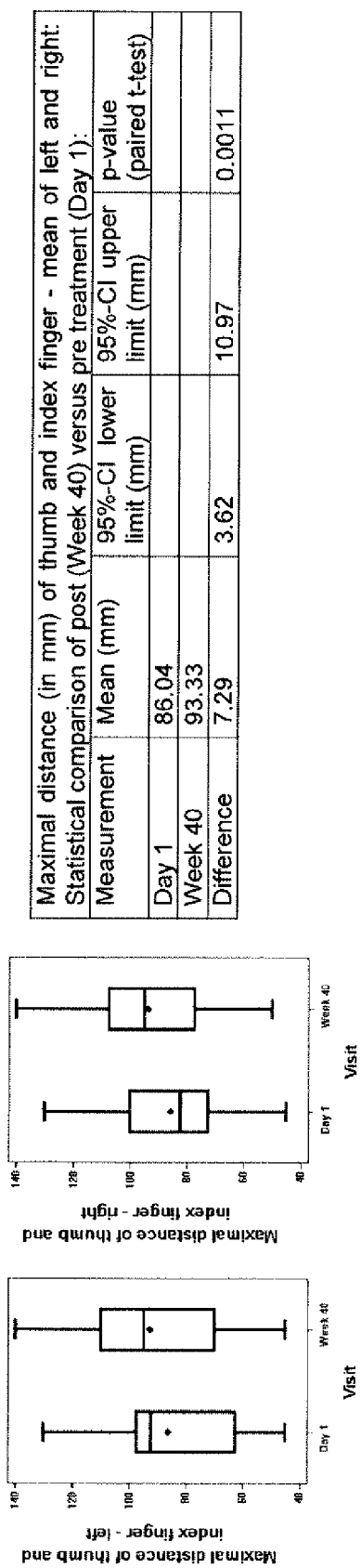
Figure 12: The maximal distance of thumb and index finger, i.e., the little span, increased after losartan treatment, indicating that the RDEB disease did not progress with regard to pseudosyndactyly.

USE OF LOSARTAN FOR THE TREATMENT OF FIBROTIC DISEASES, IN PARTICULAR EPIDERMOLYSIS BULLOSA

PRIORITY

This application corresponds to the U.S. National phase of International Application No. PCT/EP2020/085907, filed Dec. 14, 2020, which, in turn, claims priority to European Patent Application No. 19219232.6 filed Dec. 23, 2019, the contents of which are incorporated by reference herein in their entirety.

BACKGROUND OF THE INVENTION

Losartan is the generic name for 2-Butyl-4-chloro-1-[[2'-(1H-tetrazol-5-yl)[1,1-biphenyl]-4-yl]methyl]-1H-imidazol-5-methanol. The potassium salt of Losartan is commercially available as Cozaar®. Losartan is also available as generic drug product under various other designations. The present invention relates to all such products. Losartan blocks the interaction of angiotensin II and its receptor and it is mainly used for treating hypertension, heart failure, ischemic peripheral circulatory disorder, myocardial ischemia (angina pectoris), diabetic neuropathy and glaucoma and also for preventing the progression of post-myocardial infarction heart failure.

Losartan is widely used as an antihypertensive generic drug with a benign safety profile. The usual dose for starting the treatment and maintaining the treatment is for most human patients around 50 mg once daily. Depending on the weight of the patient this corresponds to about 0.5-1 mg/kg body weight of the patient based on the weight of the patient. Such concentration ranges usually for patients having a weight of from about 50 kg for a slim female up to 100 kg for a somewhat overweight male.

SUMMARY OF THE INVENTION

In the course of the present invention it was noticed that surprisingly Losartan has positive effects in the treatment of diseases which are obviously not related to hypertension. Such diseases are related to a malfunction of the skin and may involve fibrotic processes. Moreover, such diseases may be related to inflammatory processes whereby TGF-β expression is involved. Losartan has surprisingly a beneficial effect in reducing TGF-β expression and in slowing fibrosis.

In the broadest scope the present invention relates to Losartan for use in the treatment of a fibrotic disease characterized in that a dose of 0.4-1.4 mg/kg body weight of the human patient is administered daily, preferably according to the dosage regimen as described in more detail below.

In the course of the present invention it was also found that Losartan can be advantageously used in diseases wherein the patient suffers from inflammatory conditions which are mediated via the TGF-β signaling.

Dystrophic epidermolysis bullosa (DEB) is a monogenic skin fragility disorder caused by mutations in the COL7A1 gene. DEB is genetically and clinically heterogeneous, both autosomal dominant (DDEB) and recessive (RDEB) subtypes exist. It has been reported that excessive TGFβ activity in injured RDEB skin was observed. The reason therefore is not completely understood, but a number of different factors, such as its elevated expression and increased release from dermal microstructures or from infiltrating inflammatory cells are possible. TGFβ signaling is rather complex. TGFβ is secreted from cells as a latent complex which is sequestered in the extracellular matrix. To be active, TGFβ needs to be released from the latent complexes, e.g. by tractional forces from integrins and thrombospondin-1 or through proteolysis. Active TGFβ signals through TGFβ receptor I and II. Upon binding of TGFβ, the receptors become phosphorylated and transmit signals through both the canonical TGFβ signaling pathway, involving SMAD proteins, and the non-canonical pathway, involving PI3K, JNK and ERK. Physiologically, the TGFβ signaling pathway is activated during development, and in adulthood in processes like tissue regeneration and regulation of immune responses. Pathological, dysregulated activation occurs in cancer and fibroproliferative disorders, creating strong incentives for pharmacological modulation of TGF signaling. However, the tissue- and context-specificity of TGFβ signaling has challenged the development of clinically useful TGFβ inhibitors. In principle, interfering with expression/activation, or sequestering and neutralization of ligands, or inhibition of receptors or downstream signaling proteins can block the activity. However, a problem has been posed by the fact that TGFβ signaling has a remarkable ability to be restored through compensatory upregulation of pathway components. It has been found that a compound with multi-level interference, "Losartan", has positive effects in the treatment of epidermolysis bullosa, in particular when the specific dosage regimen as disclosed herein is observed.

In a particularly preferred embodiment the disease to be treated is epidermolysis bullosa. Epidermolysis bullosa designates a group of inherited skin diseases characterized by defective epithelial cell adhesion leading to skin fragility and trauma-induced blistering. Dystrophic epidermolysis bullosa is one of the major subtypes. This disease is caused by mutations in the gene coding for type VII collagen which is the main component of anchoring fibrils. These structures guarantee the firm adhesion of the epidermis to the underlying dermis.

Epidermolysis bullosa is due to genetic modifications and patients affected with the dystrophic epidermolysis bullosa may have different disease manifestations. It should be noted that the dystrophic epidermolysis bullosa may be dominantly or recessively inherited. Losartan has expected beneficial effects not only in the recessive form but also in the dominant form of dystrophic epidermolysis bullosa. Depending on the severity of the disease the manifestations range from localized blisters to generalized skin and mucosal blistering. The continuous damage to the epidermal barrier leads to frequent skin infections and persistent inflammation. The healing can be strongly compromised, with chronic wound and scar formation. The inflammatory and fibrotic skin environment favors the development of further disease complications including esophageal stenosis, pseudosyndactylies, and aggressive squamous cell carcinomas.

The recessive DEB form is frequently associated with more severe clinical signs. The patients are affected by repeated blistering which leads to protracted wound healing. Body sites which are exposed to mechanical stress, continuous cycles of blistering and altered healing develop persistent ulcerations which show incomplete reepithelialization, frequent infections and perilesional skin inflammation, chronic ulcers accompanied by fibrosis and scarring. Such patients suffer under severe conditions and there is an urgent need for a medication which makes the life of such patients better tolerable.

BRIEF DESCRIPTION OF THE DRAWINGS

FIG. 2 graphically presents the clinical impact of the losartan dosage regimen of the instant Examples in terms of Epidermolysis Bullosa Disease Activity and Scarring Index (EBDASI).

FIG. 3 graphically depicts the clinical impact of the losartan dosage regimen of the instant Examples in terms of the Itch Assessment Scale.

FIG. 4 graphically presents the clinical impact of the losartan dosage regimen of the instant Examples in terms of serum IL-6 levels.

FIG. 9 graphically presents the results of a second interim analysis performed in the clinical trial of the instant Examples, more particularly the clinical impact of the losartan dosage regimen of the instant Examples on the Birmingham Epidermolysis Bullosa Severity Score (BEBS).

FIG. 10 graphically presents the results of a second interim analysis performed in the clinical trial of the instant Examples, more particularly the clinical impact of the losartan dosage regimen of the instant Examples on the EBDASI.

FIG. 11 graphically presents the results of a second interim analysis performed in the clinical trial of the instant Examples, more particularly the clinical impact of the losartan dosage regimen of the instant Examples on the CDLQI score.

FIG. 12 graphically presents the results of a second interim analysis performed in the clinical trial of the instant Examples, more particularly the clinical impact of the losartan dosage regimen of the instant Examples in terms of the morphometric scoring of pseudosyndactyly progression.

DETAILED DESCRIPTION OF THE PREFERRED EMBODIMENTS

Figure 1:
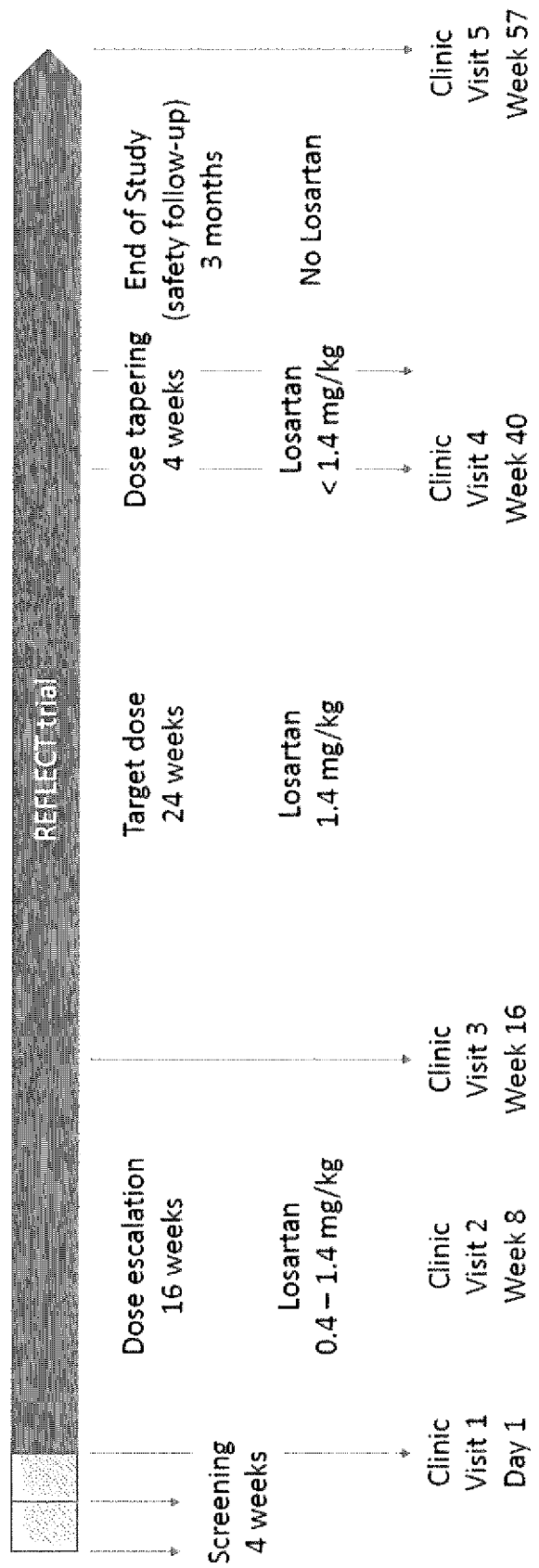
FIG. 1 presents a schematic depicting the course of the clinical trial of the instant Examples in which the beneficial effects of a losartan dosage regimen on moderate to severe RDEB is assayed.

In rodents, the use of losartan for the treatment of fibrotic diseases with oral administration has been described (Fornes et al., 1993, Journal of Cardiovascular Pharmacology, 22:305-313; WO 2012/068531 A2), including the use for treatment of RDEB in a mouse animal model (Nyström et al., 2015, EMBO Molecular Medicine 7:1211-1228; WO 2017/218623 A1). However, rodents and humans often respond differently to the same dose of a medication, which is also the case for losartan: The antihypertensive dose of losartan authorized for human use of approximately 0.7 mg/kg body weight represents a sub-antihypertensive dose in rodents. Consequently, an effective dose for human use for the treatment of fibrotic diseases such as EB has not been disclosed.

In the course of the present invention it has been found that surprisingly Losartan improves the life quality of such patients substantially when Losartan is applied systemically. According to the teaching of the present invention Losartan is applied either orally in the form of tablets, capsules or as a syrup or suspension or parenterally (e.g. as injection or infusion solution) depending on the patient's condition. This is insofar surprising as the diseases treated according to the teaching of the present invention are manifested in the skin and it would normally be expected to apply the pharmaceutically active agent which is in the present case Losartan topically to the skin in the form of a cream, ointment or the like.

Another surprising aspect of the present invention is that Losartan can be used for the treatment of the skin although it has a known hypertensive activity. The concentration used according to the present treatment scheme is higher than the dosage of Losartan which is usually used for the treatment of hypertension. Nevertheless Losartan can be administered according to the dosage regimen as disclosed herein without negative impact on the blood pressure of normotensive patients.

The dosage regimen according to the present invention can be divided in three main sections, namely first the dose escalation period, second the target dose treatment and third the dose tapering period.

In the dose escalation period which lasts from about 10 to about 20 weeks the concentration of Losartan is slightly increased. As starting concentration preferably a concentration of 0.4 mg/kg body weight of patient is applied. This dosage is increased within the dose escalation period up to 1.4 mg/kg body weight of the patient. The increase of the dose depends on how the patient can deal with the increase of the concentration. Usually an increase of about 0.05-0.1 mg/kg body weight of the patient is applied per week.

In another preferred embodiment the dose has been increased in 2 to 5 steps. In an especially preferred mode the dosage has been increased from 0.4 mg/kg after about 8 weeks to 0.8 mg/kg, and after further about 8 weeks to 1.4 mg/kg. In case the patient does not show any adverse side effects the increase of the concentration can be faster. When, however, side effects occur, the increase of the dose will be somewhat slower. In preferred embodiments the escalation period lasts from 14 to 18 weeks, in a particularly preferred embodiment the dose escalation period lasts for 16 weeks.

For the target dose treatment the effective dosage is about 1.4 mg/kg. This concentration may vary slightly depending on the specific needs of the patient from 1.3 to 1.5 mg/kg. The daily dose of preferably 1.4 mg/kg is maintained for the duration of the treatment period (target period). The treatment period may preferably last for at least 24 weeks, but it may continue also for a longer period of time up to 52 weeks. Sometimes the treatment dose may be extended. When the patient to be treated does not show adverse reactions the treatment phase may last substantially longer. Sometimes it may be a lifelong treatment. In cases where treatment with Losartan has to be stopped (e.g. in clinical trials) the dose of Losartan is slowly reduced over a period of time (tapering period) ranging from 4 weeks to 12 weeks. During this period the concentration is lowered by a range of 0.05 mg/kg up to 0.4 mg/kg body weight per week.

Consequently the exit period may last for 2 to 8 weeks, preferably 4 weeks. The tapering period may in many cases not be very critical, in particular when the patients take Losartan over a long period of time.

It should be mentioned that in general the concentrations disclosed in this application are to be considered to be average values since it is on the one hand difficult to provide exactly the dosage calculated on the body weight of the patient. On the other hand the strength of a Losartan formulation can often only be adjusted stepwise (e.g. tablets are currently available commercially only with 12.5 mg, 25 mg, 75 mg or 100 mg per tablet). When liquid formulations are used there is a slight variation which may amount to ±10% caused by the lack of precision of the metering device such as syringe or dispenser. Slight variations in the Losartan dose of 0.1 mg/kg up to 0.2 mg/kg which can be either added or subtracted from the mean values are usually possible. This means for example that 1.4 mg/kg encompasses values ranging from 1.2 mg/kg body weight up to 1.6 mg losartan/kg body weight of the patient.

EXAMPLES

In order to check whether beneficial effects could be obtained in human beings, a clinical trial has been performed. In the trial a group of about 30 patients has been selected. The course of the trial is schematically shown in FIG. 1.

In the course of the clinical trial the following results were obtained which are shown in FIGS. 2-8.

Example 1

Patient enrollment: 28 children with molecularly confirmed diagnosis of moderate to severe RDEB, age 2-16 years (age of 25 months), were enrolled at the EB Center Freiburg.

Example 2

Clinical RDEB manifestations: Since losartan does not target collagen VII and dermal-epidermal adhesion, the dermatological assessment does not primarily concern blister formation but rather inflammation and fibrosis of the skin, the functionality of the hands and the esophagus/dysphagia, and the well-being of the patient, as also evidenced by pain, itch and quality of life. Such parameters were measured in the course of the trial.

The Physician Global Assessment (PGA), a ten-point visual analog scale ranging from 0 (perfect health) to 10 (worst skin condition imaginable) was applied. This validated score allows physicians to rate disease activity by their overall impression of the patient's condition. It has been successfully used for inflammatory dermatoses such as psoriasis, eczema or dermatomyositis. Since there is no gold-standard for assessing general RDEB activity, PGA was included expecting its positive correlation with the two EB-specific scores below.

a) The Birmingham Epidermolysis Bullosa Severity Score (BEBS)

A validated severity score for all subtypes of EB at all ages that was shown to be simple, valid, sensitive and reliable. Eleven items are scored: area of damaged skin, involvement of nails, mouth, eyes, larynx and esophagus, scarring of hands, skin cancer, chronic wounds, alopecia and nutritional compromise. The area of damaged skin is allocated 50 points, and the 10 other items 5 points each, giving a maximum score of 100. The BEBS does not differentiate between active lesions and chronically damaged skin, and it has not yet been shown to detect changes with treatment. Therefore, an additional EB-specific scoring instrument was used.

b) The Epidermolysis Bullosa Disease Activity and Scarring Index (EBDASI)

A validated scoring instrument for EB that assesses response to therapy separately from chronic damage. It is therefore suitable for interventional trials. EBDASI has demonstrated significant inter-investigator reliability and validity. It includes an activity and damage component for: 1. skin; 2. scalp; 3. mucous membranes; 4. nails; 5. other epithelialized surfaces (incl. larynx, esophagus, genitourinary), hands-pseudosyndactyly and skin cancer. Statistical values for EBDASI are shown in FIG. 2 when determined at the visits in the clinic. From FIG. 2 it can be seen that during the treatment (from clinic visit 1 to clinic visit 5) the EBDASI score improved substantially.

The progress of finger contractures and pseudosyndactylies were evaluated by the validated hand function assessment score of Colville and Terrill, which assesses the extent of pseudosyndactylies and provides a rough estimation of the hand function.

The Mayo Dysphagia Questionnaire-day 30 (MDQ-30) was used to assess esophageal involvement. This validated 28-item tool measures esophageal dysphagia within the last 30 days before the visit and will assess improvement of swallowing and eating during treatment.

The Itch Assessment Scale for the Pediatric Burn Patients, a validated instrument for assessing skin burns, which are similar to RDEB. The scale is based on the Itch Man Scale developed by Blakeney & Marvin (2000), and was used to evaluate the intensity of itch of the trial participants. Since itch is also a sign of inflammation, a reduction of itch after losartan initiation was observed. Values taken at clinical visits were determined. The itch score is shown in FIG. 3 which shows an improvement.

The Wong-Baker FACES Scale for Pain that uses happy or sad faces shown in the score http://wongbakerfaces.org/) is the preferred method of pain reporting by children. This validated tool is widely used to rate pain severity in children with both chronic and acute pain. The scale shows a series of faces ranging from a happy face at 0, "no hurt" to a crying face at 10, "hurts worst".

The Quality of Life in EB (QOLEB) Questionnaire.

Although pain and itch scores partly reflect the patients' quality of life, specific scores were used. The QOLEB questionnaire was developed specifically to measure the quality of life of adults and children with EB and has been shown to be statistically reliable and valid for this group. Notably, in the published study only children above the age of 11 were able to complete it without parental assistance. Therefore, children under the age of 10 years included their parents' advice when completing the questionnaires, and children under 8 years of age or unable to read, have the parents completed the questionnaire.

The Children's Dermatology Life Quality Index (CDLQI) was used in addition, since it has a version for young children, age of >4, using cartoon images. It consists of 10 questions regarding how the skin disease has affected the patient's quality of life over the past 1 week, in each of 10 domains, with 4 possible responses graded 0-3 (range of scores 0-30).

Example 3

Skin and Serum Biomarkers of Inflammation and Fibrosis:

No systematic study of biomarkers for disease activity/progression in RDEB has been published. The current knowledge is based on: i. clinical laboratory data from patient records, ii. individual case reports, iii. preclinical studies using the RDEB mouse model, and iv. literature on biomarkers in other fibrotic conditions. The effects of losartan on inflammation and fibrosis in the skin and circulation of trial participants were investigated.

The intention was to identify tissue and serological parameters as biomarkers in RDEB, which reflect progression of fibrosis and the response to treatment.

Skin Biopsy Specimens:

Two skin biopsy specimens were obtained, one at the first clinic visit and one at week 40, at the end of full-dose losartan treatment (Visit 7-clinic). A 4-mm punch biopsy was taken from clinically unaffected skin, 1-2 cm from the border of scarred/fibrotic area at a similar site on the hands or feet, in order to increase reproducibility and to minimize variation arising from acute blistering-associated inflammation. The biopsies were fixed in formalin immediately after collection and processed for (immuno)histological analysis. First, collagen VII was stained to ensure that the biopsied area does not represent a revertant mosaic spot. Second, TGFβ activity was assessed by staining for TGFβ protein, TGF receptor II and pSMAD2/3. Inflammation and immune reactions were determined by staining with antibodies to CD3 (mature T-cells), CD4 (mainly T-helper cells), CD8 (mainly cytotoxic T-cells), CD68 (monocytes/macrophages), TNFα and IL6. Histological stains (H&E, picrosirus red) reveals the extent of fibrotic processes. At least three skin sections were stained for each marker, images captured and the intensity of the signals assessed with Image J software.

At the end of the study all biopsy samples were analyzed together and compared.

Serum Samples:

A blood sample for serum analysis was collected at all clinic visits. The analyses includes TGF levels, and biomarkers of inflammation and fibrosis, such as TNFα, CRP, ferritin, IL6 (FIG. 4) and amyloid. TGFβ and TNFα was analyzed by specific quantitative ELISAs (RayBiotech) at the EB Center Freiburg, while CRP, ferritin, IL6 and amyloid are measured at the central laboratories of the Medical Centers in Freiburg.

Example 4

Overall treatment with Losartan was safe and well tolerated. At an interim analysis (after 18 patients had completed the study) no adverse events had been observed that were related to the Losartan treatment according to the dosage regimen disclosed herein.

Figure 5:
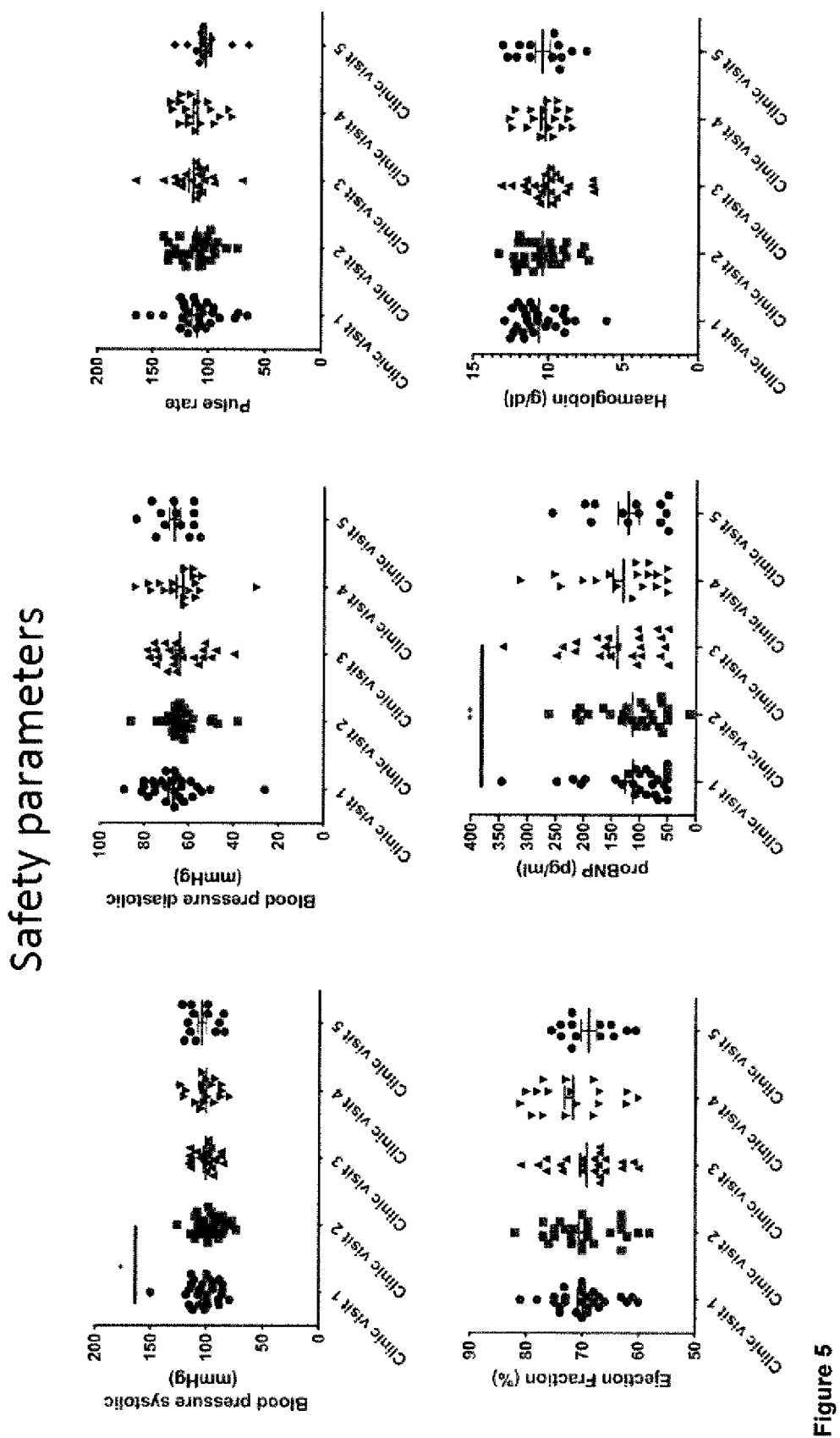
FIG. 5 graphically presents patient safety data, namely clinical parameters such as blood pressure, pulse, and heart function, measured over the course of the clinical trial of the instant Examples so as to ensure that losartan dosage regimen of the instant invention does not have a negative influence on the patients enlisted in the trial.

In order to make sure that the losartan treatment does not have a negative influence on the patients to be treated, the systolic and the diastolic blood pressure has been measured on each clinical visit for each patient. The values are presented in FIG. 5. Furthermore, the pulse rate was measured which is also shown in FIG. 5.

Additionally the ejection fraction has been measured, showing no differences in the heart's pump function. Furthermore, the proPNB(pg/ml) was also measured on each visit to evaluate for signs of heart failure. There were no significant changes found in these analyses. In order to show that no negative effect can be observed in the patients, the hemoglobin values were determined from the blood of each patient at the occasion of each visit.

Figure 6:
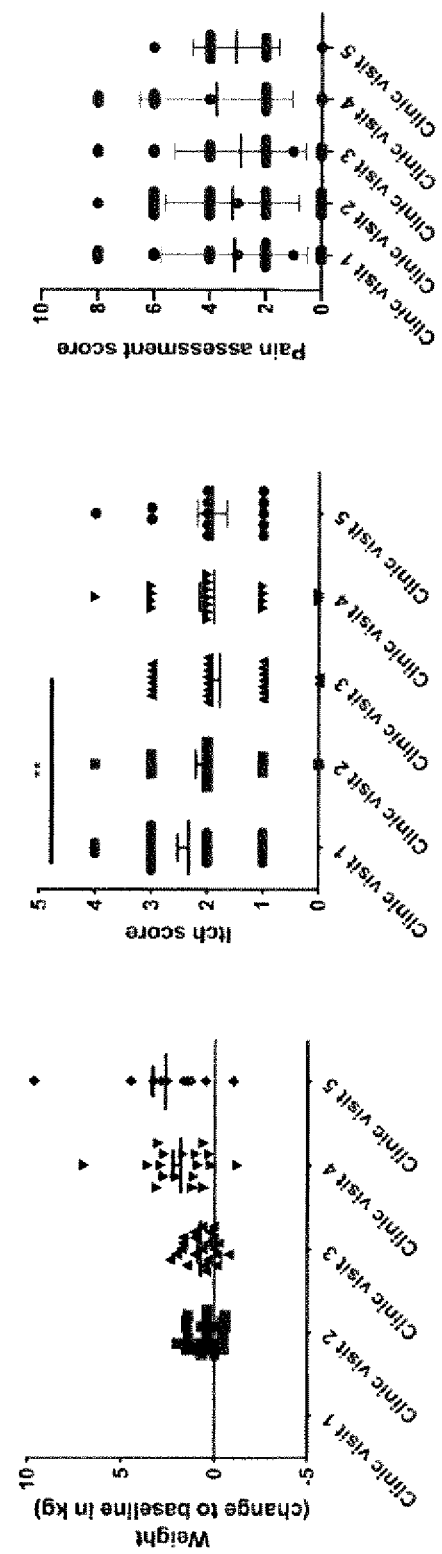
FIG. 6 graphically analyzes the efficacy of the the losartan dosage regimen of the instant Examples in terms of weight change, itch score, and pain assessment score.

The result of the dosage regimen according to the present invention can be seen from FIG. 6. The weight in relative change to base line is shown in FIG. 6. Also the pain assessment score and the itch score is shown in FIG. 6 demonstrating that the dosage regimen is effective since the pain assessment score went statistically to a lower level.

Figure 7:
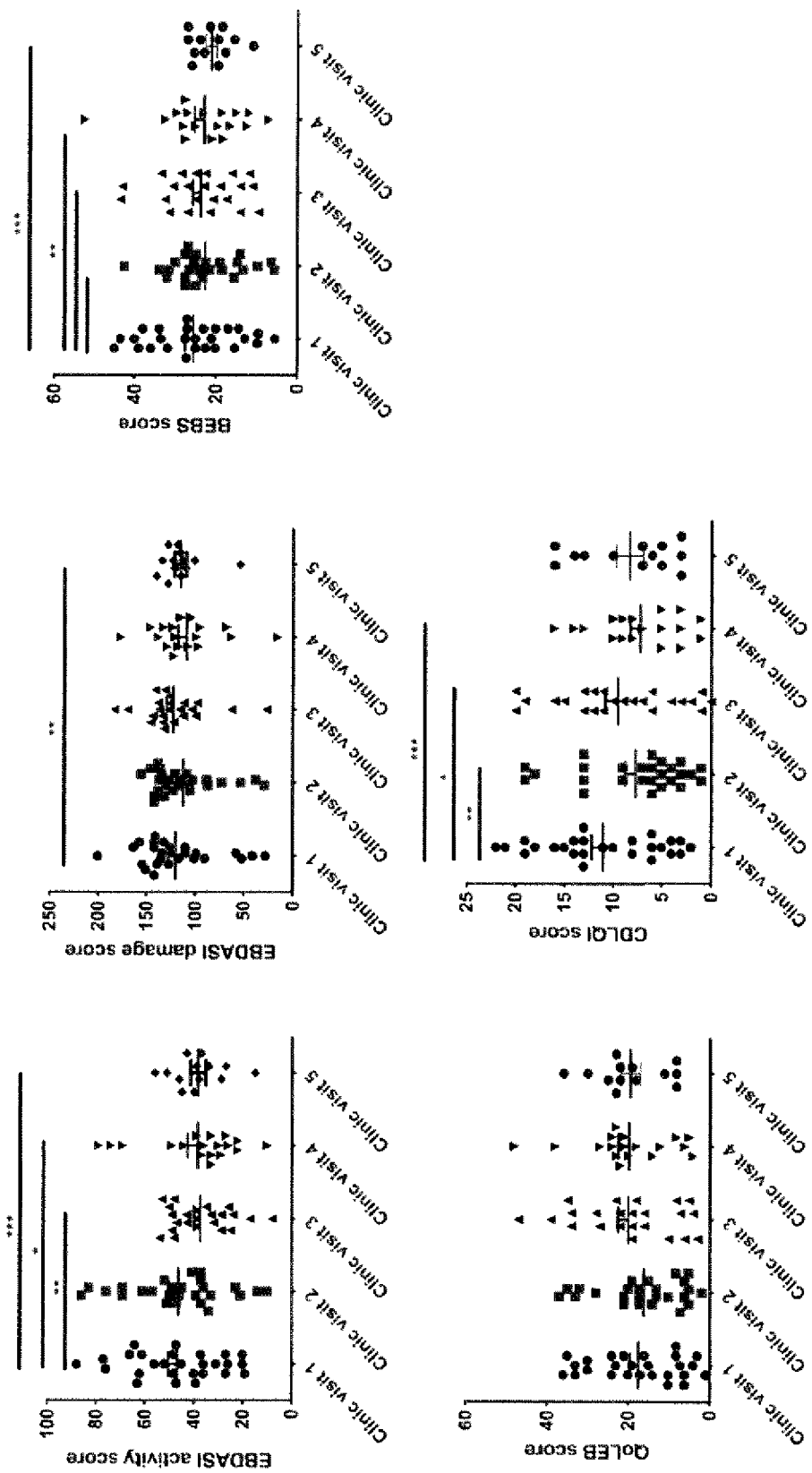
FIG. 7 graphically presents efficacy parameter scores associated with the losartan dosage regimen of the instant Examples. In particular, the EBDASI activity and damage score were improved, meaning that the EB-specific manifestations in skin and extracutaneously were improved (as seen in the EBDASI score), were followed by an improvement of the quality of life scores (QoLEB and CDLQI).
Figure 8:
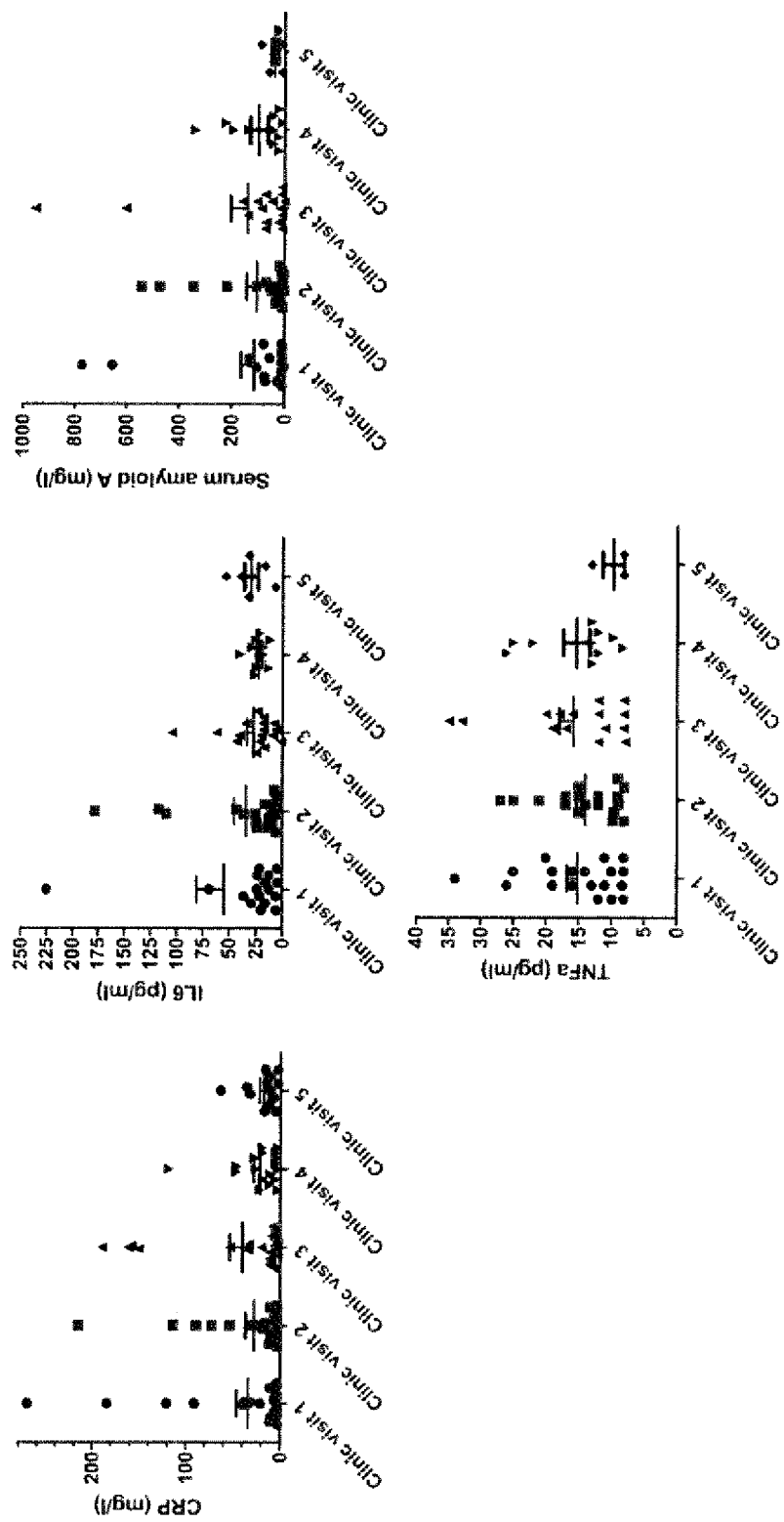
FIG. 8 graphically confirms the efficacy of the losartan dosage regimen of the instant Examples in terms of several inflammation parameters, namely CRP, IL6, Serum amyloid A and TNFα.

The efficacy parameter scores are shown in FIG. 7 whereby the EBDASI activity and damage score were improved, meaning that the EB-specific manifestations in skin and extracutaneously were improved (as seen in the EBDASI score), followed by improvement of the quality of life scores (QoLEB and CDLQI). An important aspect of the present invention is shown in FIG. 8. Several inflammation parameters (CRP, IL6, Serum amyloid A and TNFα) were measured and it was observed that those parameters went down with progression of the trial.

The various parameters measured relating to the general feeling of the patients (like itch score) and the biochemical values (inflammation parameters) demonstrate clearly the surprising effectivity of the dosage regimen disclosed herein.

Example 5

During the ongoing clinical trial described in the preceding examples, an additional novel assessment parameter was added to measure progression of finger contractures: A morphometric scoring instrument that measures the length of the span when spreading fingers as far as possible. In particular, the following parameters were measured: maximal distance of thumb tip and index finger tip (separately for left hand and right hand and the mean value of both hands), also known as 'little span'. In RDEB, disease progression leads to shortening of the span and development of pseudosyndactylies and mitten deformities.

Example 6

A second interim analysis was performed in the clinical trial described in the preceding examples. Overall, the results of the second interim analysis confirm the results of the first interim analysis presented in Example 4 with the corresponding figures.

Treatment was safe. Only 1 adverse event was reported that was possibly related to trial medication (pruritus), and this was not a serious adverse event.

Comparing baseline values (clinic visit 1, day 1) with the values obtained at the end of the trial (clinic visit 5, week 40), the BEBS (for a description of this score see Example 2) was improved (see FIG. 9). This is a remarkable result, since the focus of this score was not to detect small changes in disease state, but it was designed to provide a general impression of disease severity.

The EBDASI score (for a description of this score see Example 2), that has been shown to detect disease severity changes in particular with its EBDASI activity sub-score, was significantly improved (see FIG. 10). Both the EBDASI activity score and the EBDASI damage score showed improvement, and accordingly also the EBDASI total score (sum of EBDASI activity score and EBDASI damage score).

Also, the CDLQI score (for a description of this score see Example 2) showed an amelioration of the quality of life of the patients, comparing baseline values (clinic visit 1, day 1) to values at the end of the clinical trial (clinic visit 5, week 40) (see FIG. 11).

The new morphometric scoring instruments (for a description see Example 5) remarkably showed an increase in the little span, i.e., the distance between tip of the thumb and tip of the index finger with fingers spread as far as possible (see FIG. 12).

In summary, the data obtained in the second interim analysis confirm the observation of the first interim analysis (described in Example 4): Treatment with Losartan improved disease symptoms and reduced disease progression in RDEB patients.

The invention claimed is:

1. A method of treating epidermolysis bullosa; in a human patient in need thereof, wherein said method comprises the step of daily administering a dose of 0.4-1.4 mg Losartan per kg body weight of the human patient.

2. The method according to claim 1, characterized in that the Losartan is administered orally and/or parenterally.

3. The method according to claim 1, wherein the treatment (a) initially comprises a dose escalation period of 10-20 weeks during which the dosage of Losartan is continually increased from 0.4 to 1.4 mg/kg daily and (b) thereafter comprises a treatment phase in which Losartan is applied at a dosage of 1.4 mg/kg daily for at least 24 weeks.

4. The method according to claim 3, characterized in that the dose escalation period lasts for 14-18 weeks.

5. The method according to claim 3, characterized in that the dose escalation period lasts for 16 weeks.

6. The method according to claim 1, characterized in that the treatment comprises a dose escalation period in which the Losartan dosage is increased at a rate of 0.1-0.15 mg/kg body weight per week.

7. The method according to claim 6, wherein the dose escalation period has a duration of 16 weeks.

8. The method according to claim 7, wherein the dose escalation period is followed by a tapering phase of at least 4 weeks in which the dosage of Losartan is slowly reduced from a dosage of about 1.4 mg/kg to zero.

9. The method according to claim 8, whereby the tapering phase lasts 4 to 6 weeks.

10. The method according to claim 3, wherein the treatment is lifelong.

* * * * *